United States Patent [19]
Doerner et al.

[11] Patent Number: 5,705,287
[45] Date of Patent: Jan. 6, 1998

[54] MAGNETIC RECORDING DISK WITH METAL NITRIDE TEXTURING LAYER

[75] Inventors: Mary Frances Doerner, Santa Cruz; James Harvey Kaufman, San Jose; Serhat Metin, San Jose; Seyyed Mohammad Taghi Mirzamaani, San Jose; Anthony Wai Wu, San Jose, all of Calif.

[73] Assignee: International Business Machines Corporation, Armonk, N.Y.

[21] Appl. No.: 309,274

[22] Filed: Sep. 20, 1994

[51] Int. Cl.$^6$ ............................ G11B 5/66; G11B 5/70
[52] U.S. Cl. ............................ 428/694 TS; 360/104; 428/694 TR
[58] Field of Search ............... 428/694 T, 694 TS, 428/694 TC, 694 TR; 360/104; 204/192.15

[56] References Cited

U.S. PATENT DOCUMENTS

| | | | |
|---|---|---|---|
| 4,543,301 | 9/1985 | Yazawa et al. | 428/621 |
| 5,030,494 | 7/1991 | Ahlert et al. | 428/64 |
| 5,053,250 | 10/1991 | Baseman et al. | 427/131 |
| 5,079,062 | 1/1992 | Masuda et al. | 428/64 |
| 5,091,225 | 2/1992 | Goto | 427/430.1 |
| 5,134,038 | 7/1992 | Baseman et al. | 428/611 |
| 5,353,182 | 10/1994 | Nakamura et al. | 360/104 |
| 5,364,690 | 11/1994 | Takahashi et al. | 428/212 |
| 5,389,418 | 2/1995 | Ota et al. | 428/64 |
| 5,397,644 | 3/1995 | Yamashita | 428/408 |
| 5,413,835 | 5/1995 | Ikeda et al. | 428/141 |
| 5,427,867 | 6/1995 | Kogure et al. | 428/611 |
| 5,474,830 | 12/1995 | Yamaguchi et al. | 428/141 |

FOREIGN PATENT DOCUMENTS

| | | | |
|---|---|---|---|
| 0 399 747 A2 | 11/1990 | European Pat. Off. | G11B 5/64 |
| 0 567 748 A1 | 11/1993 | European Pat. Off. | G11B 5/64 |
| 4325329 | 2/1994 | Germany . | |
| 04-62412 | 10/1992 | Japan | G11B 5/62 |
| 04-62413 | 10/1992 | Japan | G11B 5/62 |
| 04-62414 | 10/1992 | Japan | G11B 5/62 |
| 06-052536 | 2/1994 | Japan . | |
| 289098 | 5/1988 | United Kingdom | G11B 00/01 |

*Primary Examiner*—John J. Zimmerman
*Assistant Examiner*—Michael LaVilla
*Attorney, Agent, or Firm*—Thomas R. Berthold

[57] ABSTRACT

A thin film cobalt alloy magnetic recording disk has a metal nitride layer located between the disk substrate and the top surface of the disk to provide texturing of the disk at the head-disk interface. The texturing layer is made up of generally contiguous clusters of aluminum nitride (AlN) with rounded upper surfaces that are formed on top of the substrate and under the conventional Cr underlayer. The AlN texturing layer is formed by sputtering an Al target in the presence of $N_2$ gas. The subsequently sputter-deposited Cr underlayer, cobalt alloy magnetic layer and protective amorphous carbon overcoat replicate the upper surface of the contiguous AlN clusters, resulting in a textured surface at the head-disk interface. The AlN texturing layer may also be sputter deposited above the magnetic layer in the middle of the protective carbon overcoat. The density and size of the AlN clusters in the texturing layer, and thus the texture of the completed disk at the head-disk interface, are controlled by the amount of $N_2$, the sputtering power and pressure, and the substrate temperature.

6 Claims, 5 Drawing Sheets

MAGNETIC RECORDING DISK WITH METAL NITRIDE TEXTURING LAYER

TECHNICAL FIELD

This invention relates to a magnetic recording disk, in particular to a disk hang a textured surface, and to the process for making the disk. The invention also relates to a rigid disk drive incorporating such a disk and having an improved head-disk interface and data readback signal.

BACKGROUND OF THE INVENTION

In one type of rotating magnetic recording rigid disk drives, each of the read/write transducers (or heads) is supported on a carrier (or slider) that rides on a cushion or bearing of air above the surface of its associated disk when the disk is rotating at its operating speed. The slider has an air-bearing surface (ABS), typically in the form of a plurality of rails, and is connected to a linear or rotary actuator by means of a suspension. There may be a stack of disks in the disk drive with the actuator supporting a number of sliders. The actuator moves the sliders radially so that each head may access the recording area of its associated disk surface.

The slider in this conventional disk drive is biased toward the disk surface by a small force from the suspension. The ABS of the slider is thus in contact with the disk surface from the time the disk drive is turned on until the disk reaches a speed sufficient to cause the slider to ride on the air bearing. The ABS of the slider is again in contact with the disk surface when the disk drive is turned off and the rotational speed of the disk fails below that necessary to create the air bearing. This type of disk drive is called a contact start/stop (CSS) disk drive. To provide wear resistance for the ABS in a CSS disk drive, a protective overcoat may be placed on the slider rails. IBM's U.S. Pat. No. 5,159,508 describes a slider with air-bearing rails having an amorphous carbon overcoat that is adhered to the rails by a silicon adhesion layer.

The magnetic recording disk in a CSS rigid disk drive is typically a thin film disk comprising a substrate, such as a disk blank made of glass, ceramic, glassy carbon or an aluminum-magnesium (AlMg) alloy with a nickel-phosphorous (NiP) surface coating, and a cobalt-based magnetic alloy film formed by sputter deposition over the substrate. A protective overcoat, such as a sputter-deposited amorphous carbon film, is formed over the magnetic layer to provide corrosion resistance and wear resistance from the ABS of the slider. A liquid fluoroether lubricant is also maintained on the surface of the protective disk overcoat to prevent damage to the head and the disk during starting and stopping of the disk.

Protective carbon overcoats for thin film disks and slider air-bearing surfaces are well known. They are typically formed by sputter deposition from a graphite target, and are generally called protective carbon overcoats, "diamondlike" carbon overcoats, amorphous carbon overcoats, or, in the case of those overcoats formed by sputter deposition in the presence of a hydrogen-containing gas, hydrogenated carbon overcoats. Tsai et at. in "Structure and Properties of Sputtered Carbon Overcoats on Rigid Magnetic Media Disks", *J. Vac. Science Technology* A6(4), July/August 1988, pp. 2307–2314, describe such protective carbon overcoats and refer to them as amorphous "diamondlike" carbon films, the "diamondlike" referring to their hardness rather than their crystalline structure. IBM's U.S. Pat. No. 4,778,582 describes a protective hydrogenated disk carbon overcoat formed by sputtering a graphite target in the presence of Ar and hydrogen ($H_2$). The carbon overcoats may also be formed by plasma-enhanced chemical vapor deposition (CVD) and may include nitrogen in addition to hydrogen, as described by Kaufman et al., *Phys. Rev. B*, Vol. 39, June 1989, p. 13053.

In addition to the magnetic layer and the protective overcoat, the thin film disk may also include a sputter-deposited underlayer, such as a layer of chromium (Cr) or a chromium-vanadium (CrV) alloy, between the substrate and the magnetic layer and a sputter-deposited adhesion layer, such as a Cr, tungsten (W) or titanium (Ti) layer, between the magnetic layer and the protective overcoat.

To improve the wear resistance of the disk, as well as to maintain consistent magnetic properties, it is desirable to make the disk surface as smooth as possible. However, a very smooth disk surface in a CSS disk drive creates what is called "stiction". This means that after the slider ABS has been in stationary contact with the disk for a period of time, the slider tends to resist translational movement or "stick" to the disk surface. It is known that this "stiction" force can increase over time. Thus, the stiction force measured relatively soon after a CSS cycle is called "CSS stiction", while that measured several hours after a CSS cycle is called "rest stiction". Stiction is caused by a variety of factors, including static friction and adhesion forces between the disk and slider created by the lubricant or by capillary condensation of atmospheric water vapor. Stiction in a CSS disk drive can result in damage to the head or disk when the slider suddenly breaks free from the disk surface when disk rotation is initiated. Because the suspension between the actuator and the slider is relatively fragile to permit the slider to fly above the disk surface, sudden rotation of the disk can also damage the suspension.

To avoid the stiction problem associated with CSS disk drives, some disk drives are of the "load/unload" type. In this type of drive, the slider is mechanically unloaded from the disk, typically by means of a ramp that contacts the suspension when the actuator is retracted at power down, and then loaded back to the disk when power is turned on and the disk has reached a speed sufficient to generate the air bearing. Even in load/unload disk drives, however, stiction can be a problem in the event of failure of the load/unload system.

The more common solution to the stiction problem is to texture the disk. Typically, this is done by abrasive polishing of the disk substrate, which results in a texturing of the conforming layers deposited over the substrate. U.S. Pat. No. 5,108,781, assigned to Magnetic Peripherals, Inc., describes texturing the disk substrate by laser heating to form a pattern of pits in the substrate surface. The disk overcoat replicates the texture of the substrate and reduces the stiction when the slider is resting on the disk overcoat. However, abrasive polishing and laser texturing of the substrate adds to the disk manufacturing cost and complexity because it cannot be done in situ in the conventional sputter deposition process chamber.

IBM's U.S. Pat. No. 5,053,250 describes an in-situ process for forming a textured underlayer on the disk substrate. The '250 patent teaches the use of a low melting point metal material that forms discontinuous liquid spheres as it is sputter deposited on a heated substrate. The magnetic layer and overcoat that are deposited over the solidified spheres follow this discontinuous topology, resulting in a textured surface at the head-disk interface.

Texturing of the entire disk substrate, whether by abrasive polishing, laser texturing or an in-situ process, has the additional disadvantage that the crystalline growth of the magnetic layer can be adversely affected if the texturing is not carefully controlled. This results in degraded magnetic properties, especially at high recording densities where a high signal-to-noise ratio (SNR) and a low soft error rate (SER) are required. To avoid this problem, the texturing of the disk substrate may be limited to a nondata band, called the landing zone, where the slider is moved when the disk drive is stopped. The landing zone, which adds to the complexity of the drive electronics, is required to prevent the substrate texturing from adversely affecting the magnetic properties of the disk in the data region.

As an alternative to texturing the substrate, texturing of the disk protective overcoat has been suggested. This can be accomplished by abrasive polishing or other mechanical processes, or by chemical or laser etching as described in *IBM Technical Disclosure Bulletin*, October 1989, p. 264. Another type of overcoat "texturing", as described in IBM's U.S. Pat. No. 5,030,494, involves cosputtering the carbon with other material additives, such as tungsten carbide, to form clusters of the additives that project above the relatively smooth carbon overcoat surface and present a discontinuous head-disk interface. These types of prior disk overcoat texturing techniques either involve additional complex and costly ex-situ process steps or result in an overcoat which is not the preferred continuous film of amorphous carbon.

What is needed is a thin film magnetic recording disk that presents a continuous textured surface to the head carrier and that can be fabricated in situ using conventional processes. The disk must have reduced stiction and no degradation in magnetic recording performance.

SUMMARY OF THE INVENTION

The invention is a thin film magnetic recording disk having a metal nitride texturing layer located between the disk substrate and the top surface of the disk. In a preferred embodiment, the texturing layer comprises clusters of aluminum nitride (AlN) that are formed on the substrate under the underlayer. The AlN texturing layer is formed by sputtering an Al target in the presence of $N_2$ gas. This results in generally contiguous clusters of AlN with generally rounded upper surfaces being deposited on the substrate. The subsequently sputter-deposited underlayer, magnetic layer and disk overcoat replicate this surface, resulting in a textured disk surface at the head-disk interface. In an alternative embodiment, the metal nitride texturing layer is formed above the magnetic layer, either directly on the magnetic layer or in the middle of the protective carbon overcoat. The density and size of the AlN clusters in the texturing layer, and thus the texture of the completed disk at the head-disk interface, are controlled by the amount of $N_2$, the sputtering power and pressure, and the substrate temperature.

For a fuller understanding of the nature and advantages of the present invention, reference should be made to the following detailed description taken in conjunction with the accompanying figures.

DETAILED DESCRIPTION OF THE INVENTION

Prior Art

Figure 1:
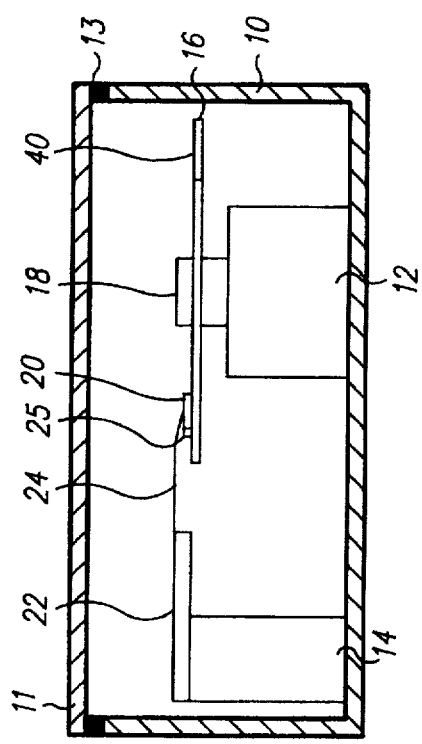
FIG. 1 is a view in section of a schematic of a prior art CSS disk drive.

Referring to FIG. 1, there is illustrated in sectional view a schematic of a prior art CSS disk drive. The disk drive comprises a base 10 to which are secured a disk drive motor 12 and an actuator 14, and a cover 11. The base 10 and cover 11 provide a substantially sealed housing for the disk drive. A gasket 13 is located between base 10 and cover 11 and a small breather port (not shown) equalizes pressure between the interior of the disk drive and the outside environment.

A magnetic recording disk 16 is connected to drive motor 12 by means of hub 18 to which it is attached for rotation by the drive motor 12. A lubricant film 40 is maintained on the surface of disk 16. The substrate for disk 16 is typically made of glass, ceramic, glassy carbon or an AlMg alloy having a textured NiP surface coating. The texturing of the substrate, which is most commonly done by abrasive polishing, causes a replication of the textured topography in the subsequently deposited underlayer, magnetic layer, and protective overcoat so that the overcoat presents a textured outer surface at the head-disk interface. In CSS disk drives, the substrate may be textured only in a nondata region referred to as the landing zone, where the slider 20 is moved when the disk drive is stopped.

A read/write head or transducer 25 is formed on the trailing end of a carrier, such as an air-bearing slider 20. Transducer 25 may be an inductive read and write transducer or an inductive write transducer with a magnetoresistive (MR) read transducer. The slider 20 is connected to the actuator 14 by means of a rigid arm 22 and a suspension 24. The suspension 24 provides a biasing force that urges the slider 20 toward the surface of the recording disk 16.

During operation of the disk drive, the drive motor 12 rotates the disk 16 at a constant speed, and the actuator 14, which is typically a linear or rotary voice coil motor (VCM), moves the slider 20 generally radially across the surface of the disk 16 so that the read/write head may access different data tracks on disk 16.

Figure 2:
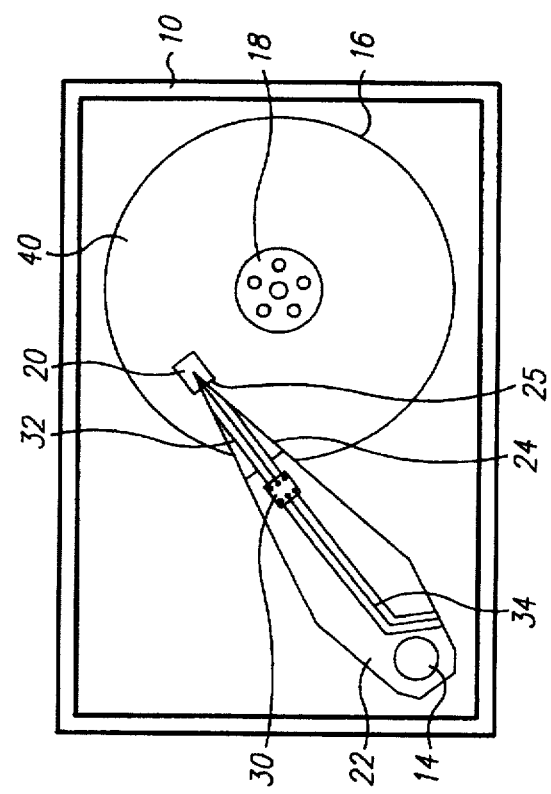
FIG. 2 is an open top view of the prior art disk drive depicted schematically in FIG. 1.

FIG. 2 is a top view of the interior of the disk drive with the cover 11 removed, and illustrates in better detail the suspension 24 that provides a force to the slider 20 to urge it toward the disk 16. The suspension may be a conventional type of suspension, such as the well-known Watrous suspension, as described in IBM's U.S. Pat. No. 4,167,765. This type of suspension also provides a gimbaled attachment of the slider which allows the slider to pitch and roll as it rides on the air bearing. The data detected from disk 16 by the transducer 25 is processed into a data readback signal by signal amplification and processing circuitry in the integrated circuit chip 15 located on arm 22. The signals from transducer 25 travel via flex cable 17 to chip 15, which sends its output signals via cable 19.

Preferred Embodiment

Figure 3:
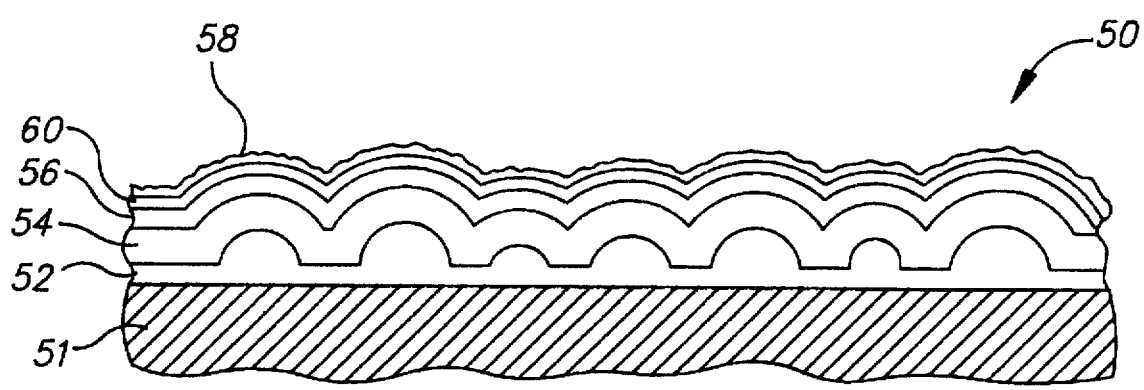
FIG. 3 is a view in section illustrating the layers forming the thin film disk according to the embodiment of the present invention where the texturing layer is formed on the disk substrate.

The thin film disk 50 according to the present invention is illustrated in section in FIG. 3. When used in place of the prior art disk 16 shown in FIGS. 1 and 2, disk 50 results in a disk drive with an improved head-disk interface but without adverse effects on SNR and SER. The disk 50 comprises a glass disk blank as substrate 51, a texturing layer 52 formed directly on glass substrate 51, a Cr underlayer 54 formed on the substrate 51, a CoPtCr alloy magnetic layer 56 formed on the Cr underlayer 54, a protective overcoat 60 formed on the magnetic layer 56, and a lubricant film 58 on the protective overcoat 60. Alternative substrates usable with the present invention may be made of silicon (Si), silicon-carbide (SIC), ceramic, glassy carbon or an AlMg disk blank with a NiP surface coating. The texturing layer 52 comprises clusters of aluminum nitride (AlN) that have generally spherically-shaped or rounded surfaces. Underlayer 54 and magnetic layer 56 are formed by conventional sputter deposition. The disk overcoat 60 may be formed of any conventional disk overcoat material. However, in the preferred embodiment, the overcoat 60 is hydrogenareal essentially amorphous carbon. The overcoat 60 may also be doped with nitrogen.

Disks as shown in FIG. 3 were fabricated using smooth glass substrates (average surface roughness $R_a$=5Å) in a DC magnetron sputtering system having multiple sputtering chambers. The glass substrates were first washed using detergent and distilled water. As part of the normal manufacturing process, the substrates were heated to 180° C. (±70° C.). The substrates are heated to improve the later deposition of the cobalt alloy magnetic layer. In the first chamber, containing a commercially available target of aluminum (99.99% purity), argon (Ar) and nitrogen ($N_2$) gases were introduced. The Ar/$N_2$ volumetric flow rate ratio was approximately 5:1, and is preferably in the range of 10:1 to 3:1. The DC sputtering power was 500 watts and is preferably in the range of 200–1000 watts. Sputtering pressure was maintained in the range of 5–20 mTorr. During this sputtering step, the nitrogen gas reacts with the Al from the sputtering target and clusters consisting essentially of the compound AlN are formed on the glass substrate. The clusters are generally contiguous so that the texturing layer 52 can be described as an AlN layer having rounded bumps over its top surface. The thickness of the texturing layer 52 is controlled by controlling the deposition time. In the preferred embodiment, the texturing layer 52 has a mean thickness in the range of 100–300Å.

The formation of the rounded AlN clusters is dependent on the substrate temperature, the sputtering pressure and power and the Ar/$N_2$ volumetric flow rate ratio. It has been discovered that for the specific Intervac brand sputtering system used if power is below approximately 200 watts, the AlN layer has no texturing; and if the power is above approximately 700 watts, the outer surface of the AlN layer is no longer in the desired shape of rounded bumps, but has generally random projections with discontinuous peaks and valleys.

Following the deposition of the texturing layer 52, the disks were moved to the next successive sputtering chambers where the 500–1000Å Cr underlayer 54 and the 300–700Å CoPtCr magnetic layer 56 were formed in an Ar-only atmosphere. Finally, the disks were moved to the final sputtering chamber where the hydrogenated carbon overcoat 60 was formed to a thickness of 100–250Å in an Ar-$H_2$ atmosphere.

While the disks were made in a sputtering system with separate isolated sputtering chambers, it is also possible to make the disks using an in-line system where there is only a single vacuum chamber and the disks are moved past the different sputtering targets in succession. In this type of system, such as the commercially available Ulvac and Leybold brand systems, the $N_2$ gas is added only in the region of the Al sputtering target.

Figure 4:
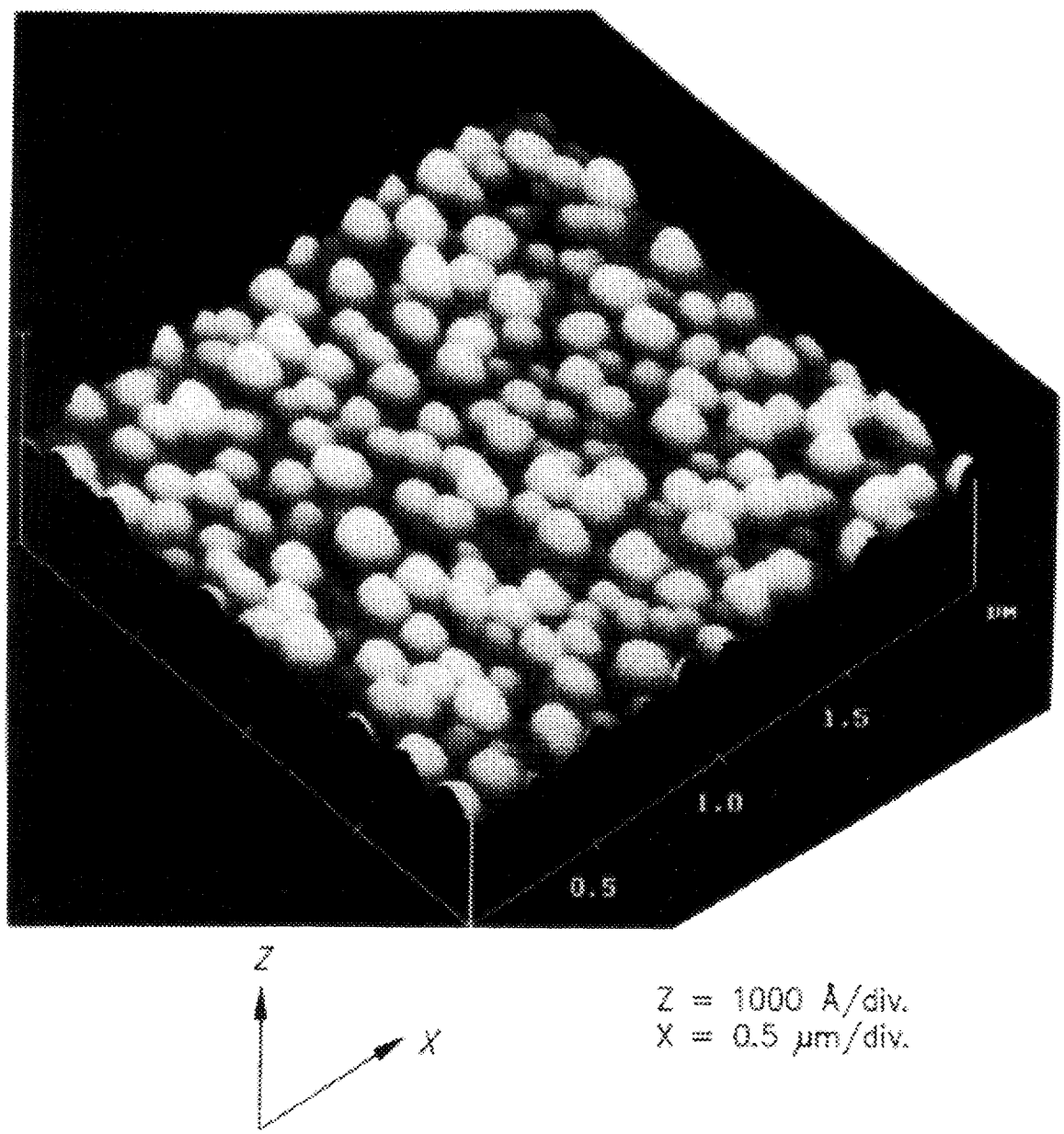
FIG. 4 is an atomic force microscope (AFM) micrograph of the topography of the outer surface of the thin film disk according to the embodiment of the present invention where the texturing layer is sputter deposited on the disk substrate.

FIG. 4 is an atomic force microscope (AFM) micrograph of the topography of the outer surface of the carbon overcoat 60 of the disk with the texturing layer 52 formed directly on the glass substrate 51. As is apparent, the outer surface of the overcoat 60 has replicated the texturing provided by the clusters of AlN. FIG. 4 shows that the in-plane spacing of the tops of the clusters is on the order of 0.1 microns (1000Å) which is significantly greater than the thickness of the cobalt-based alloy magnetic layer 56.

The SNR measured at 3000 flux reversals/mm for disks made with varying amounts of $N_2$ gas in the sputtering chamber showed a generally linear increase from approximately 32.5 dB to approximately 35 dB as $N_2$ was increased from 0 to 20% of the Ar-$N_2$ gas mixture. These values indicate that the addition of the $N_2$ to the Al favorably controls the crystallographic preferred orientation and grain structure of the Cr underlayer and the CoPtCr magnetic layer. X-ray diffraction analysis of the Cr layer and the CoPtCr magnetic layer deposited over the AlN texturing layer shows a substantial decrease in the [110] preferred orientation in the Cr layer and thereby the [0002] preferred orientation in the CoPtCr magnetic layer. Furthermore, a strong (10.0) peak was observed in the CoPtCr magnetic layer, indicating the alignment of the C-axis in the plane of the magnetic layer which enhances the recording performance.

The measured SER for the disks showed significant improvement at high linear recording densities (4000–6000 flux reversals/mm) compared with conventional mechanically textured disks. This improvement is due to the absence of the so-called "texture-induced noise" present in mechanically textured disks.

The density and size of the AlN clusters can be controlled by the amount of $N_2$, the sputtering power and pressure, and the substrate temperature. At a given sputtering power, the duster size decreases with increasing $N_2$. The cluster density is controlled by substrate temperature, sputtering pressure, and the surface energy of the substrate. For example, an increase in substrate temperature reduces the density of the dusters. In the above experimental examples, the substrates were heated. However AlN clusters have been successfully formed on substrates without the application of heat. While the process was described for disks with glass substrates, the AlN clusters have also been successfully formed on substrates of ceramic (e.g., Memcor brand substrate from Corning Glass), glassy carbon (e.g., the amorphous carbon substrate available form Kobe Precision), semiconductor grade Si wafer, and AlMg with a NiP surface coating. For each of these substrates different process parameters of $N_2$ concentration, sputtering power and pressure, and substrate temperature must be experimentally selected to deposit the AlN clusters at the desired size and density.

Figure 5:
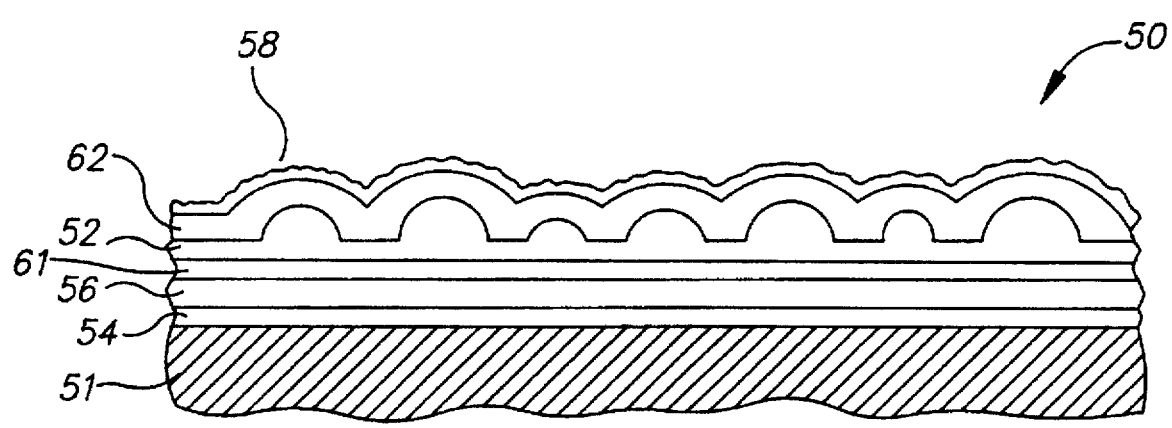
FIG. 5 is a view in section illustrating the layers forming the thin film disk according to the embodiment of the present invention where the texturing layer is formed over the magnetic layer.
Figure 6:
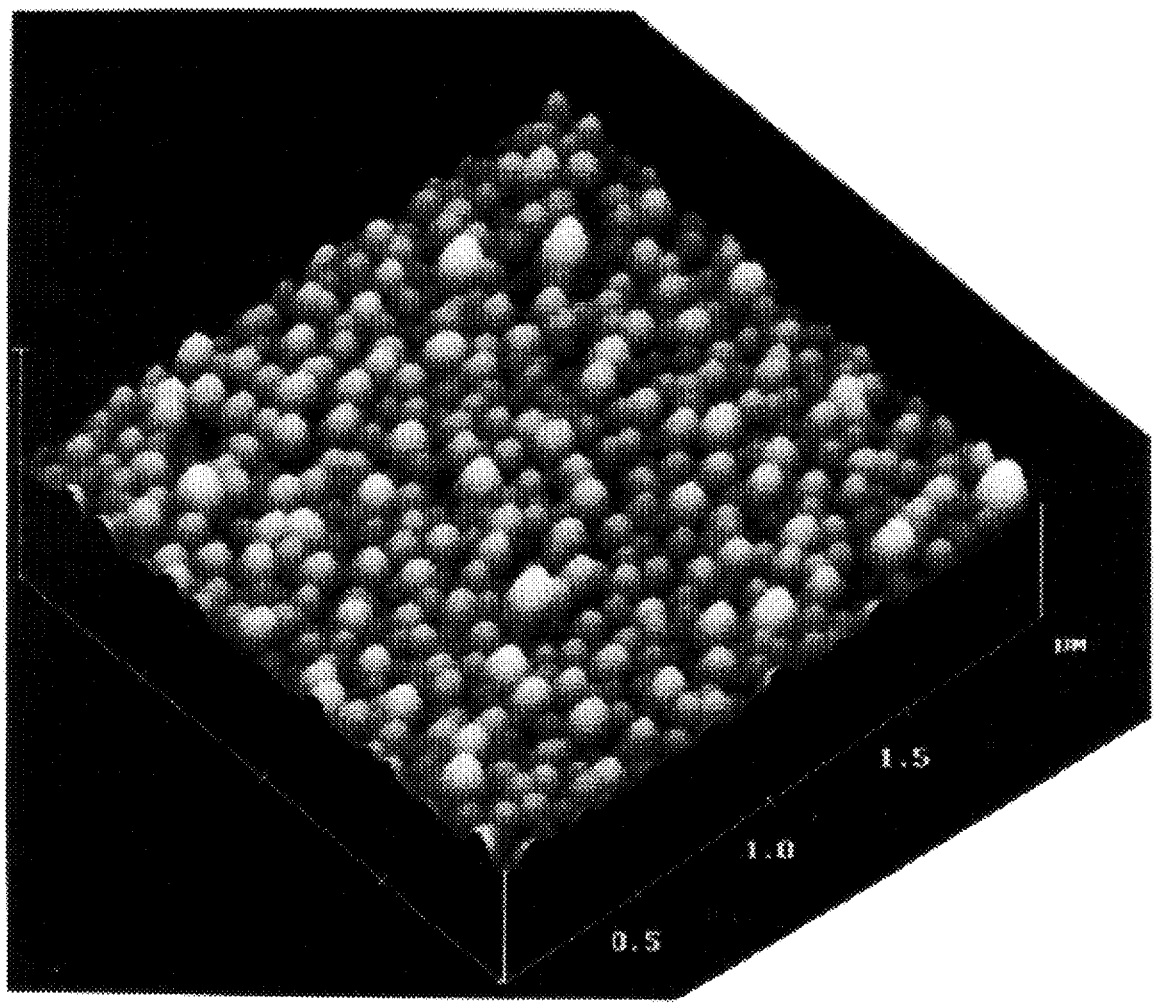
FIG. 6 is an atomic force microscope (AFM) micrograph of the topography of the outer surface of the thin film disk according to the embodiment of the present invention where the texturing layer is sputter deposited over the magnetic layer.

Thin film disks were also fabricated as described above but with the texturing layer 52 formed either directly on the magnetic layer 56 or, as shown in the embodiment of FIG. 5, on a first carbon layer 61 of 50Å thickness with a second carbon layer 62 of 100Å thickness being deposited directly on the texturing layer 52. In the embodiment of FIG. 5, the carbon overcoat thus includes first carbon layer 61, texturing layer 52, and second carbon layer 62. The process is the same as previously described except that the $N_2$ gas is introduced into a sputtering chamber down line from the sputtering chamber where the magnetic layer 56 was deposited. In the embodiment where the texturing layer 52 is deposited directly on the magnetic layer 56, the sputtering chamber containing the Al target is located between the magnetic layer chamber and the carbon overcoat chamber.

The first and second carbon layers 61, 62 in the embodiment of FIG. 5 can also be deposited using RF CVD with substrate bias (−400 Vdc) applied. The RF power is preferably 300 Watts and the gases are c-pentane (4 sccm), Ar (2 sccm), and $N_2$ (14 sccm). The total pressure during CVD is 33 mTorr. The hydrogen content of the carbon layers made using RF CVD is 27 (±3) atomic percent and the nitrogen content is 4 (±1) atomic percent.

The disks as fabricated with the texturing layer 52 directly on the magnetic layer 56 and in the middle of the carbon overcoat 60 were then tested for start/stop performance and the results compared with results for control disks (without the texturing layer) tested under identical conditions. The disk drives were commercially-available drives outfitted with sliders having carbon-coated rails. The pass/fail stiction condition for the start/stop measurements required that the maximum force exerted on the slider during the initial 60 ms after the disk drive motor startup be kept below 8 gm. However, different drives use different drive motors so this criteria can change with drive design. The standard CSS cycle consisted of a 0.17 minute rest period and a 0.10 minute flying period at a maximum rotational speed of 3600 rpm. The measured stiction after several CSS cycles was between 2 and 4 gm for all the disks with the texturing layer and greater than 80 gm for all the control disks.

In addition to exhibiting acceptable stiction levels, the disks with the texturing layer 52 formed on top of the magnetic layer 56, or as part of the carbon layer 60, were also durable and corrosion resistant. Also, the total overcoat thickness, about 250Å, is well within the range necessary to minimize the spacing between the read/write head and the magnetic layer on the disk (i.e., less than about 350Å).

In the experimental disks described above, the texturing layers were formed by sputtering Al in the presence of the Ar-$N_2$ gaseous atmosphere. Titanium (Ti) and niobium (Nb) have also been experimentally determined to provide a texturing layer with generally rounded clusters of the respective metal nitride. The density of these clusters was generally higher and their height generally lower than the AlN clusters. It is believed that any metal that forms a compound with nitrogen will provide such a texturing layer since the formation of the compound reduces the surface mobility of the metal atoms as they strike the substrate. This reduction in surface mobility is believed to be the reason that, given the proper sputtering power and Ar/$N_2$ ratio, the metal nitride forms on the substrate as generally rounded clusters rather than as generally flat islands. For each such metal, the sputtering power and Ar/$N_2$ ratio would be experimentally determined in order to provide a layer with rounded metal nitride clusters having the desired density and size. The substrate temperature is a less effective parameter to control cluster density and spacing for metals with higher melting points than Al.

While the present invention has been particularly shown and described with reference to the preferred embodiments, it will be understood by those skilled in the art that various changes in form and detail may be made without departing from the spirit, scope, and teaching of the invention. Accordingly, the disclosed invention is to be considered merely as illustrative and limited in scope only as specified in the appended claims.

What is claimed is:

1. A magnetic recording disk of the type that has a plurality of thin films including a magnetic metal alloy layer, an underlayer onto which the magnetic layer is deposited and a protective overcoat over the magnetic layer, the disk comprising:

a rigid disk substrate made of glass, silicon, silicon-carbide or glassy carbon and having a generally planar surface onto which said plurality of thin films are deposited, the substrate surface including an annular shaped region between the disk center and the disk outer, perimeter, the annular region covering an area less than the area of said disk substrate surface;

a metal nitride film located directly on, in contact with and covering the entirety of said annular region of said disk substrate surface and onto which the underlayer is deposited, the metal nitride film covering the entirety of said annular region so that no portion of the underlayer deposited on the metal nitride film is in contact with said annular region of said disk substrate surface, the metal nitride film having a surface topography, after deposition on said annular region, of generally rounded bumps that provide a surface that is textured compared to the generally planar surface of said annular region of said disk substrate surface;

an underlayer formed directly on, in contact with, and covering the entirety of the metal nitride film, the underlayer conforming to the surface topography of the metal nitride film and thereby having a textured surface, after deposition on the metal nitride film, that replicates the surface topography of the underlying metal nitride film;

a magnetic layer comprising an alloy of cobalt and one or more other elements formed directly on, in contact with, and covering the entirety of the underlayer, the magnetic layer conforming to the surface topography of the underlayer and thereby having a textured surface, after deposition on the underlayer, that replicates the surface topography of the underlying underlayer; and a protective overcoat formed directly on, in contact with, and covering the entirety of the magnetic layer, the overcoat conforming to the surface topography of the magnetic layer and thereby having a textured surface, after deposition on the magnetic layer, that replicates the surface topography of the underlying magnetic layer.

2. The magnetic recording disk according to claim 1 wherein the overcoat consists essentially of amorphous carbon.

3. A thin film disk according to claim 1 wherein the essentially amorphous carbon overcoat includes an element selected from the group consisting of hydrogen and nitrogen.

4. The magnetic recording disk according to claim 1 wherein the underlayer is chromium or an alloy of chromium.

5. The magnetic recording disk according to claim 1 wherein the metal nitride film consists essentially of aluminum nitride.

6. The magnetic recording disk according to claim 1 wherein the metal nitride film consists essentially of titanium nitride or niobium nitride.

* * * * *